United States Patent [19]

Jennings et al.

[11] Patent Number: 5,796,895
[45] Date of Patent: Aug. 18, 1998

[54] FIBER OPTIC LIGHTING-INLINE CONNECTOR

[75] Inventors: Kurt Lynn Jennings, Warren, Ohio; John Fred Wassam, Canonsburg, Pa.

[73] Assignee: General Motors Corporation, Detroit, Mich.

[21] Appl. No.: 799,540

[22] Filed: Feb. 12, 1997

[51] Int. Cl.$^6$ .................................................. G02B 6/38
[52] U.S. Cl. .......................... 385/56; 385/58; 385/59; 385/77
[58] Field of Search ........................ 385/56, 58–60, 385/62, 66, 70, 71–77, 81, 86–87

[56] References Cited

U.S. PATENT DOCUMENTS

| | | | |
|---|---|---|---|
| 4,887,875 | 12/1989 | Chang et al. | 385/60 |
| 5,210,810 | 5/1993 | Darden et al. | 385/78 |
| 5,394,494 | 2/1995 | Jennings et al. | 385/58 |

Primary Examiner—Rodney B. Bovernick
Assistant Examiner—Hemang Sanghavi
Attorney, Agent, or Firm—Cary W. Brooks

[57] ABSTRACT

The invention includes male and female fiber optic inline connectors constructed to be mated together. Each connector includes a cable passage extending through the connector for receiving one or more fiber optic cables. Flexible alignment fingers extend from a connector housing and are constructed and arranged to engage the sides of a fiber optic cable and properly align the cable with respect to the center of the cable passage to greatly reduce or eliminate the effects of tolerance stack up and associated loss of light. The flexible alignment fingers are generally spaced apart and radially positioned symmetrically with respect to the center of the cable passage.

14 Claims, 5 Drawing Sheets

5,796,895

1

FIBER OPTIC LIGHTING-INLINE CONNECTOR

TECHNICAL FIELD

This invention relates generally to fiber optic distribution systems and more particularly to fiber optic inline connectors for such systems.

BACKGROUND OF THE INVENTION

Fiber optic distribution systems have a variety of uses including lighting the interior of automobiles. An automotive fiber optic interior lighting (FOIL) system generally includes a light source and a fiber optic harness assembly that has a bundle of jacketed fiber optic cables for conveying light from the light source to courtesy lights, indicator lights and other devices that require lighting at various locations in the automobile. Typically, the fiber optic harness assembly is made up of a number of fiber optic sub-harnesses that are connected together. A main fiber optic harness may be split into two branches that run down opposite sides of the automobile. These branches are then connected by fiber optic inline connectors to several fiber optic sub-harnesses that may be installed in doors, head liners, instrument panels and other parts of the automobile. In some instances the fiber optic sub-harnesses may be connected to another fiber optic sub-harness. These fiber optic sub-harnesses may have one or several fiber optic cables that need to be connected to one or several fiber optic cables of the main fiber optic harness or another fiber optic sub-harness.

Jennings et al U.S. Pat. No. 5,394,494 discloses such a fiber optic inline connector. The fiber optic inline connector includes mating connector bodies each having a concentric cable passage that extends through the connector body from a connector end to a cable end. The connector bodies have cable passages that are circular, oval, triangular or rectangular in cross section to accommodate one, two, three or four fiber optic cables respectively. However, in order to insert the fiber optic cable into the connector passages, the passages must be made larger than the cables and with a sufficient tolerance to allow for the easy insertion of the fiber optic cables. Further, the geometries of the passages as illustrated in Jennings et al are subject to substantial radial displacement of the fiber optic cables with respect to a center line of the connector body or cable passage. Since both the male and female connector bodies are similarly constructed, these tolerances stack up. As a result, misalignments of fiber optic cables with respect to the center of the connector body in both the male and female connectors results in substantial loss of the light intended to be transmitted through the inline connectors. For example, in a typical system, taking into account all of the production tolerances associated with making an inline fiber optic connector there could be a ½ millimeter misalignment of the fibers which would result in a 50% light loss.

The present invention provides alternatives to and advantages over the prior art.

SUMMARY OF THE INVENTION

The invention is a solution to fiber optic cable misalignment problems associated with assembly dimensions and tolerance stack of prior art designs. The invention includes male and female fiber optic inline connectors constructed to be mated together. Each connector includes a cable passage extending through the connector for receiving one or more fiber optic cables. Flexible alignment fingers extend from a

2 connector housing and are constructed and arranged to engage the sides of a fiber optic cable and properly align the cable with respect to the center of the connector or cable passage to greatly reduce or eliminate the effects of tolerance stack up and associated loss of light. The flexible alignment fingers are preferably spaced apart and radially positioned symmetrically with respect to the center of the cable passage.

These and other objects, features and advantages of the present invention will become apparent from the following brief description of the drawings, detailed description and appended claims and drawings.

DESCRIPTION OF THE PREFERRED EMBODIMENT

Figure 1:
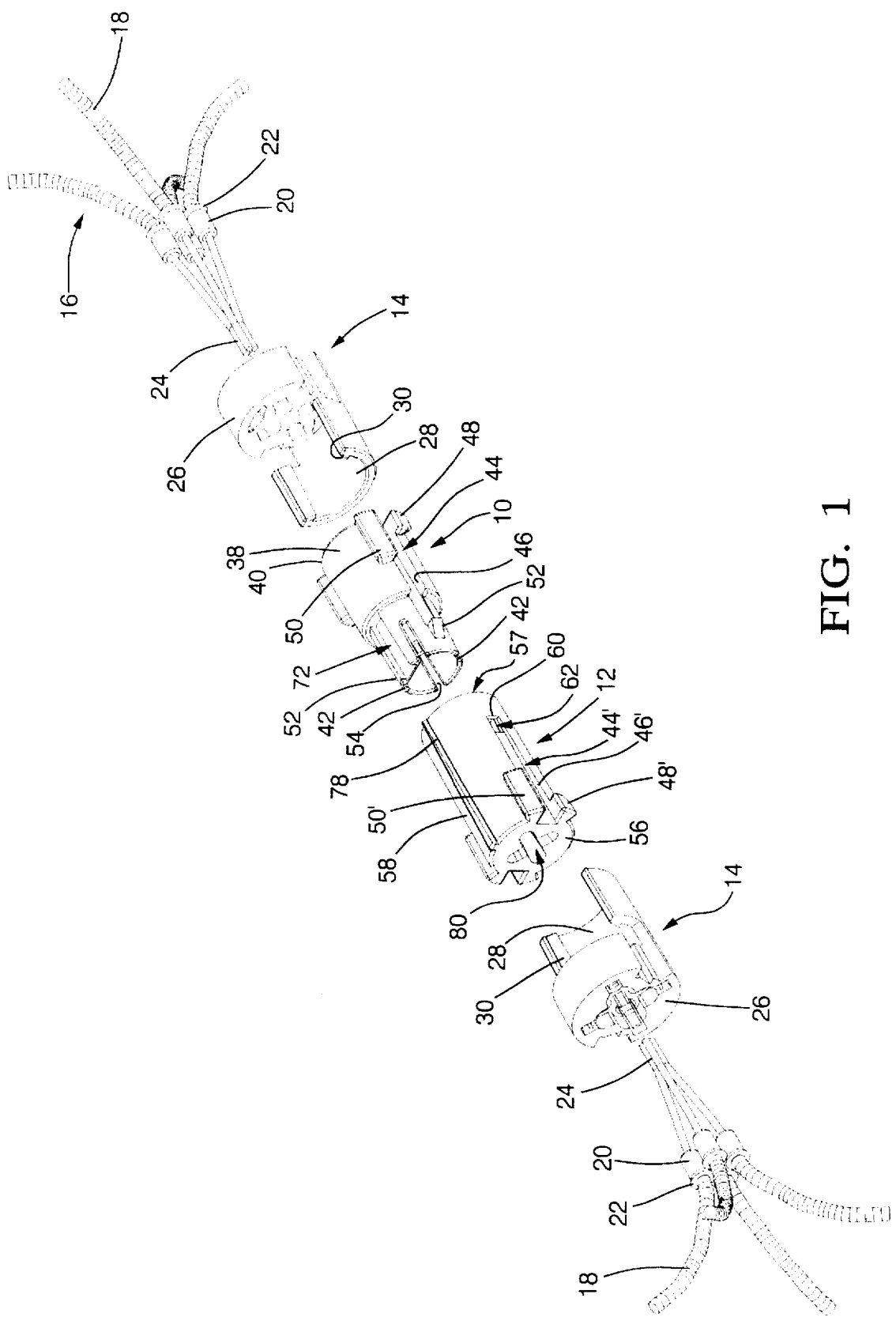
FIG. 1 is an exploded view of a fiber optic inline connector according to the present invention.
Figure 2:
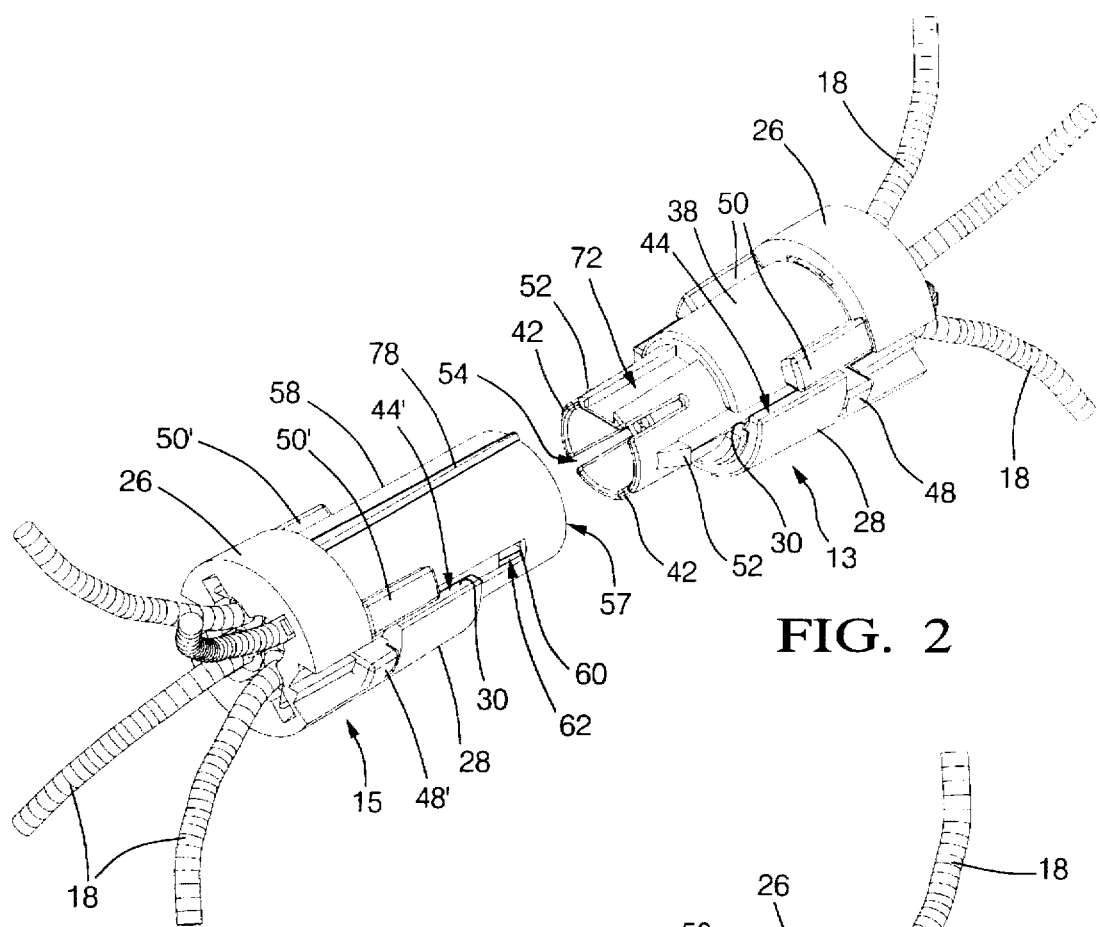
FIG. 2 illustrates a male connector/terminal position assurance member subassembly and a female connector/ terminal position assurance member subassembly according to the present invention.
Figure 3:
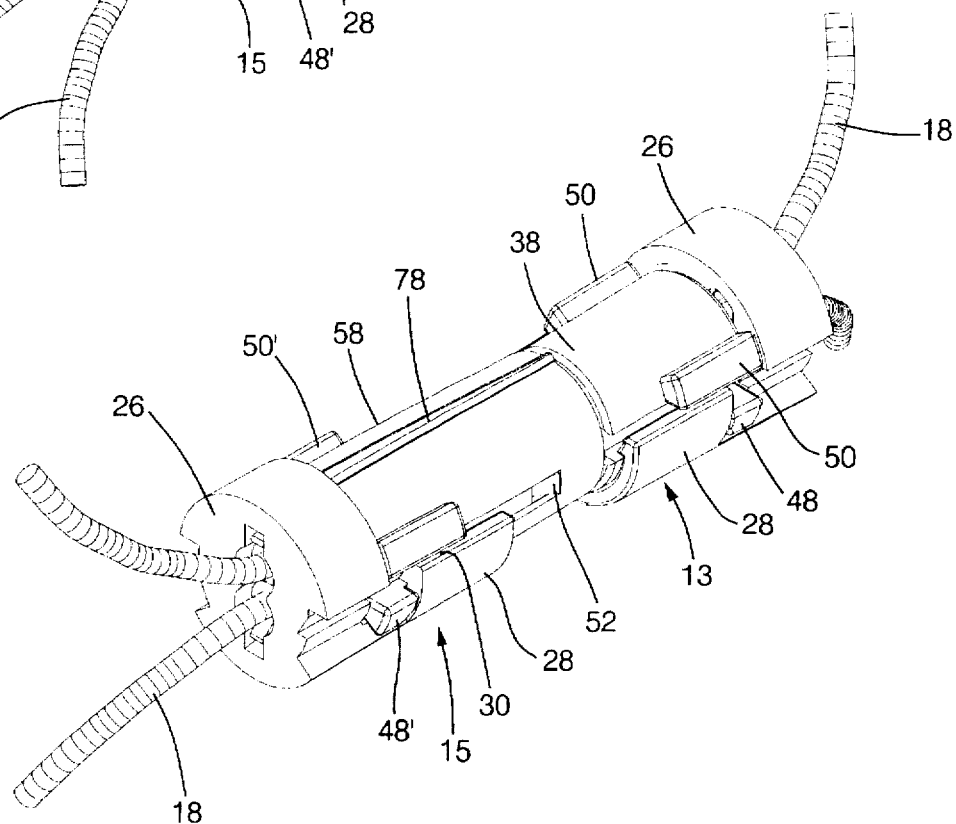
FIG. 3 illustrates a fiber optic inline connector in an assembled position according to the present invention.

Referring to FIGS. 1–3, a fiber optic inline connector system according to the present invention includes a male connector 10 for mating to a female connector 12. Both the male and female connectors 10, 12 have an associated terminal position assurance member 14 (TPA) which may be identically constructed for both the male and female connectors 10, 12. The male connector 10 and TPA 14 are connected together as a subassembly 13. Likewise, the female connector 12 and TPA 14 are connected together as a subassembly 15 (FIG. 2). A plurality of fiber optic cables 16 may be inserted into the subassemblies and the male and female connectors 10, 12 mated to provide an inline fiber optic connection. The subassemblies 13, 15 are then mated together to provide a fiber optic lighting inline connector. Greater detail regarding each component of the fiber optic inline connector system will now be described.

Referring again to FIG. 1, the fiber optic cable 16 may include a portion having a jacket 18 which terminates at a crimped ring 20 having an annular lip 22 on an outer surface. A free end 24 of the fiber optic cable 16 is bare and unjacketed.

Figure 9:
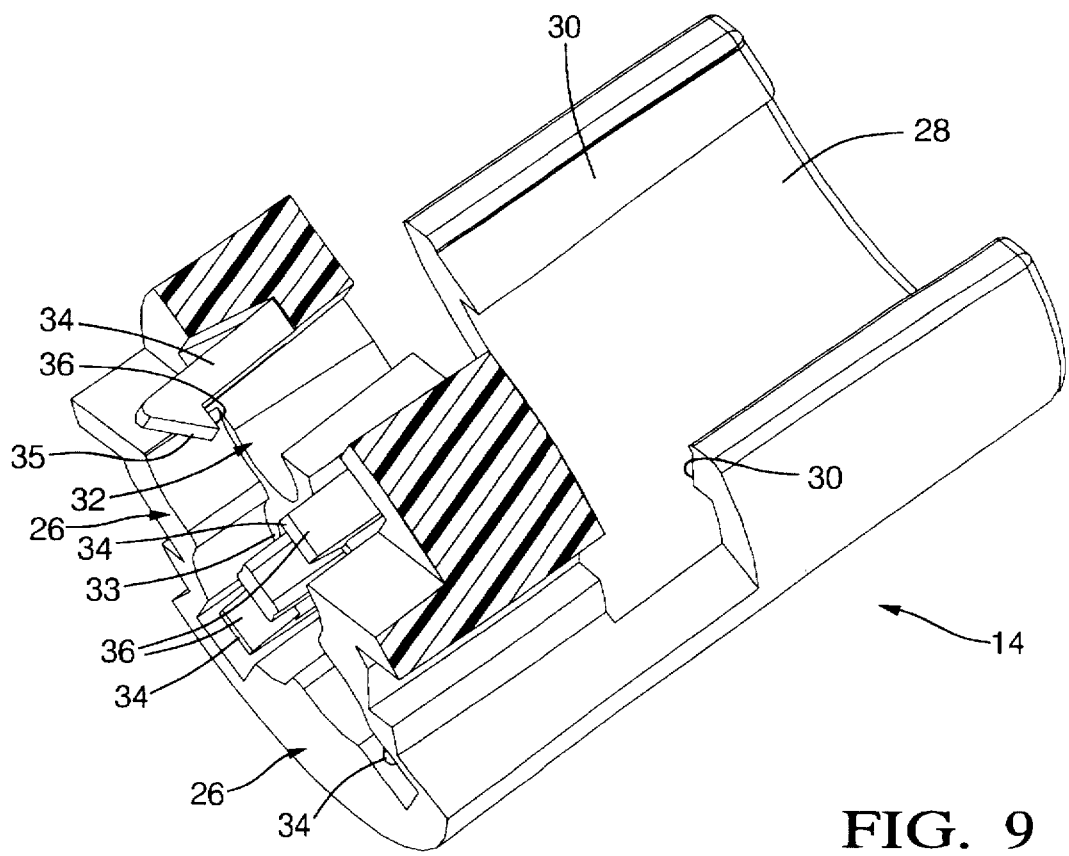
FIG. 9 is an enlarged view of a terminal position assurance member with portions broken away to show flexible ramped fingers for locking against a crimped ring of the fiber optic cable according to the present invention.

Each TPA includes a generally disc-shaped base 26 and a flexible saddle 28 extending from the base (FIG. 1). Preferably the saddle 28 is generally semi-cylindrical in shape and includes a locking rail 30 extending inwardly from each edge of the flexible saddle. As best can be seen from FIG. 9, the disc-shaped base 26 of the TPA includes a plurality of apertures 32 extending therethrough. An engagement surface 33 is provided in the disc-shaped base 26 adjacent the aperture 32 for engaging the annular lip 22 of the crimp ring and stopping the forward movement of the fiber optic cable 16. A flexible ramped finger 34 with a ramped surface 35 and locking shoulder 36 extends from the disc-shaped base 26. Upon insertion of the cable 16 into the TPA 14, the annular lip 22 of the crimped ring engages the ramped surface 35 of the flexible finger 34 to flex radially outward until the annular lip 22 moves pass the locking shoulder 36 wherein the finger 34 snaps back trapping the lip 22 between the locking shoulder 36 and the engagement surface 33 and preventing both forward and rearward movement of the cable 16.

Referring to FIGS. 1-3, the male connector 10 includes a housing having a cylindrical shell 38 and a base 40 connected at one end of the shell and a pair of spaced apart tongues 42 extending from another end of the shell. The shell 38 has a pair of diametrically opposed longitudinal troughs 44 formed in an outer surface. Each trough 44 is defined in part by a trough wall 46 so that the flexible saddle 28 of the TPA 14 can be placed underneath the male connector 10 and over a portion of the shell 38 so that the locking rails 30 are snapped into the trough 44 and held in position by the trough wall 46. Preferably, the male housing 10 includes a stop nub 48 positioned near the rear of the shell 38 to prevent the TPA 14 from being slid off the male connector 10 in a rearward direction. Preferably, the male connector 10 includes an elongated indexing bar 50 extending outwardly from the shell 30 to prevent the TPA 14 from being improperly mated to the male connector 10 from a top position.

A ramped lock nub 52 is located on each of the spaced apart tongues 42. A slot 54 separates the spaced apart tongues 42 so that the tongues are relatively flexible and can be displaced radially to allow insertion into the female connector 12.

Referring again to FIGS. 1-3, the female connector 12 includes a base 56 connected to a first end of an outer shell 58. The other end 57 of the shell 58 on the female 12 connector is open to receive the tongues 42 of the male connector 10. A pair of lock shoulders 60 are each defined in the shell 58 preferably by an aperture 62 extending through the shell 58 and constructed and arranged to receive one of the ramped locking nub 52 on the tongue 42 of the male connector 10 for locking the female and male connectors together (FIG. 3). The shell 58 of the female connector also has a pair of diametrically opposed troughs 44'. Each trough 44' is defined in part by a trough wall 46' and is constructed to receive the locking rail 30 on the flexible saddle of the TPA 14 in the same manner as described above. The female connector also includes a stop nub 48' at the rear of the shell 58 for preventing removal of the TPA 14 in a rearward direction and an elongated indexing bar 50' for preventing the TPA 14 from being secured to the female connector from a top position. Both the male connector 10 and the female connector 12 have a cable passage 80 extending therethrough beginning at the base 40, 56 of each of the connectors (FIG. 1).

Figure 6:
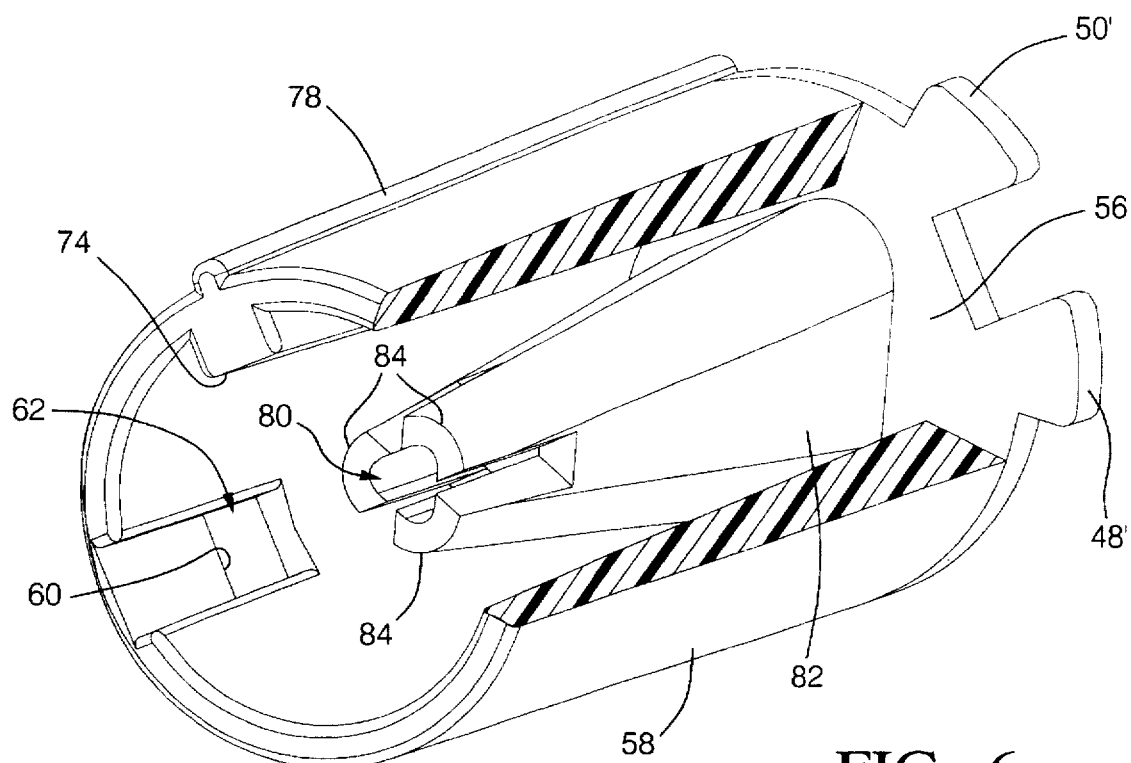
FIG. 6 illustrates a three-way female connector with portions broken away to show a plurality of flexible fingers that align three fiber optic cables according to the present invention.

Referring to FIGS. 1 and 6, an indexing tab 74 carried on an inside surface 76 of the shell 58 of the female connector 12 to be received in an indexing trough 72 formed in an outer surface of one of the tongues 42 on the male connector. A rib 78 may be formed on an outside surface of shell 58 of the female connector aligned with the indexing tab 74 to provide a visual or tactile aid in aligning the indexing tab 74 with the indexing trough 72 in the tongue of the male connector 10.

As will be appreciated from FIGS. 4-8, preferably a projection 82 extends from each of the bases 40, 56 of the connectors through which the cable passage 80 extends. A plurality of flexible alignment fingers 84 extend from the projection 82 and are preferably radially and symmetrically spaced apart with respect to a center line of the cable passage 80. The flexible alignment fingers 84 engage the sides of the fiber optic cable 16 near its free end 24 (FIG. 1) to perfectly align the fiber optic cables with respect to the center line of the cable passage 80 and to eliminate the effects of tolerance stack up. The flexible fingers 84 may take on any configuration, but are preferably arcuate shaped (i.e., arc shaped in cross section) to better engage the cylindrical shaped sides of the fiber optic cables 16. When the fiber optic cables are inserted into the subassembly, the flexible alignment fingers 84 gives or flexes enough to allow the fiber optic cables 16 to be inserted but are resilient enough to force the fiber optic cables into proper alignment with respect to a center line extending through the cable passage 80. The shells 30, 58 are constructed so that the projection 82, flexible alignment fingers 84 and free end 24 of the cable are surrounded and protected by the shell 30, 58.

Figure 4:
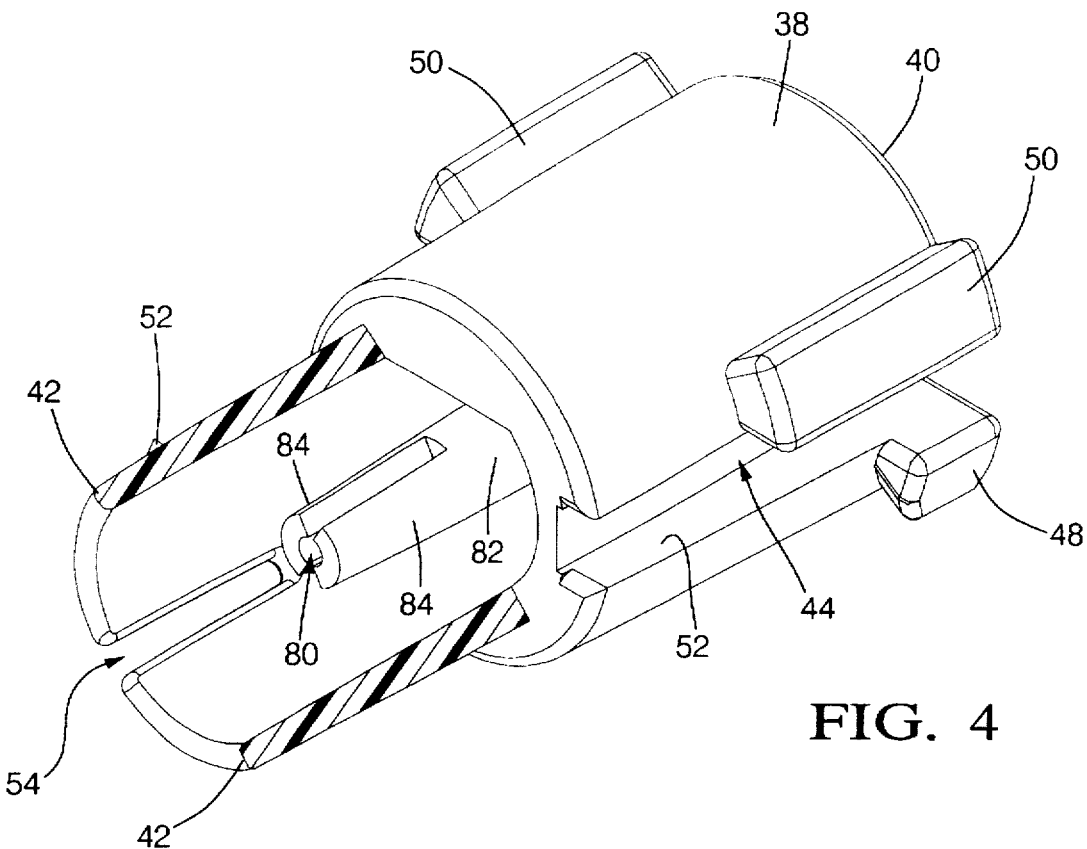
FIG. 4 illustrates a one-way male connector with portions broken away to show flexible fingers that align a fiber optic cable according to the present invention.
Figure 5:
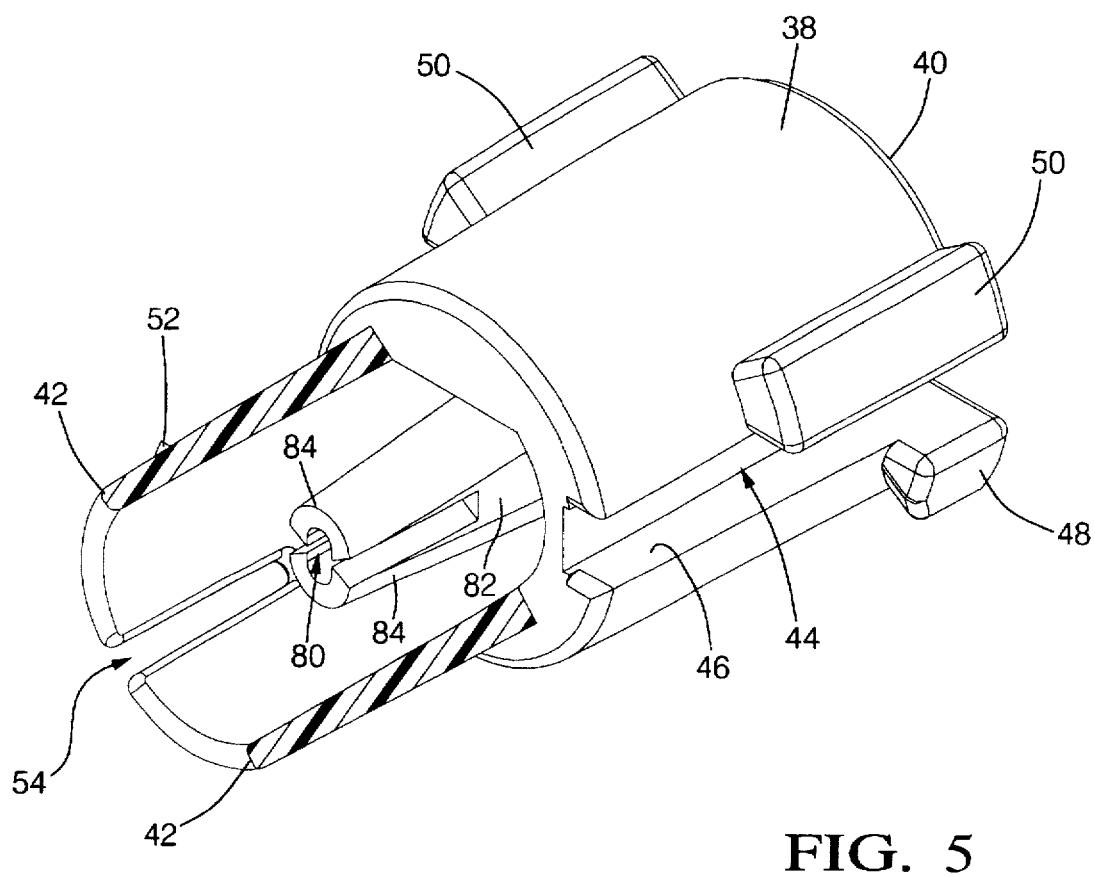
FIG. 5 illustrates a two-way male connector with portions broken away and showing a plurality of flexible fingers that align two fiber optic cables according to the present invention.
Figure 7:
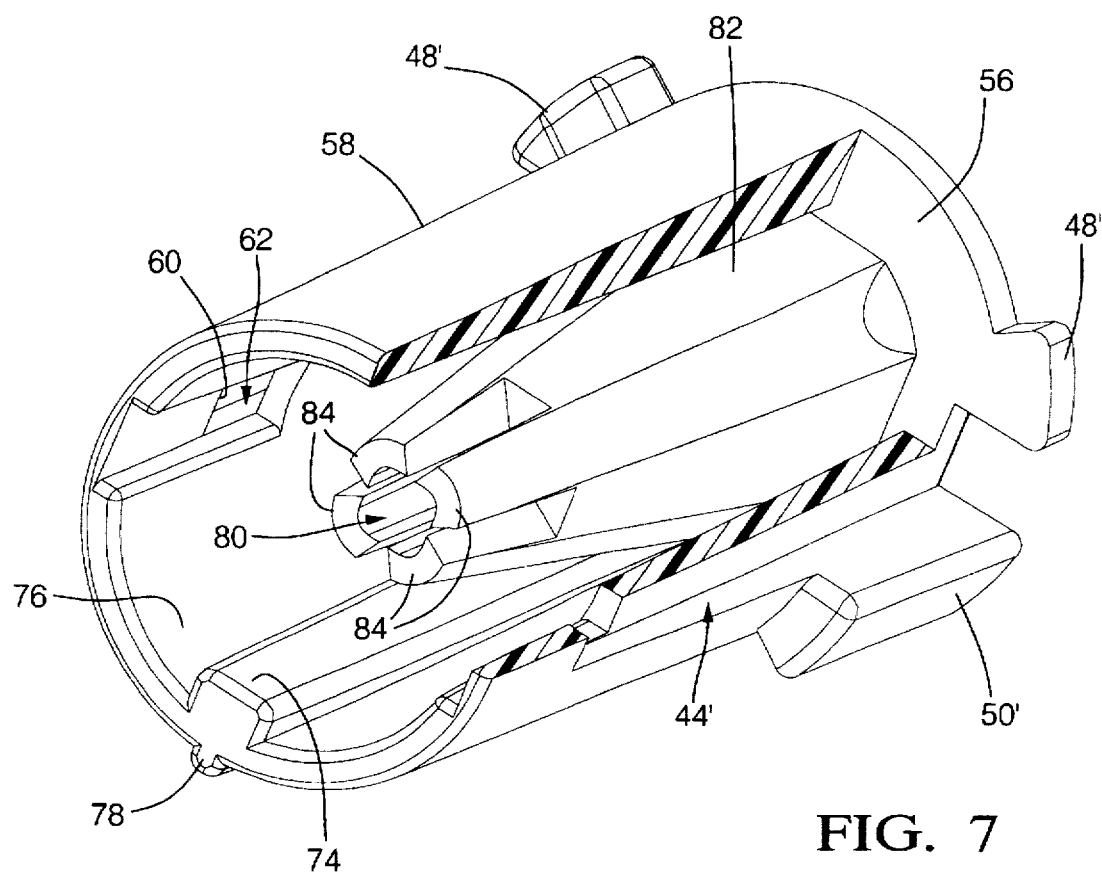
FIG. 7 illustrates a four-way female connector with portions broken away to show a plurality of flexible fingers that align four fiber optic cables according to the present invention.
Figure 8:
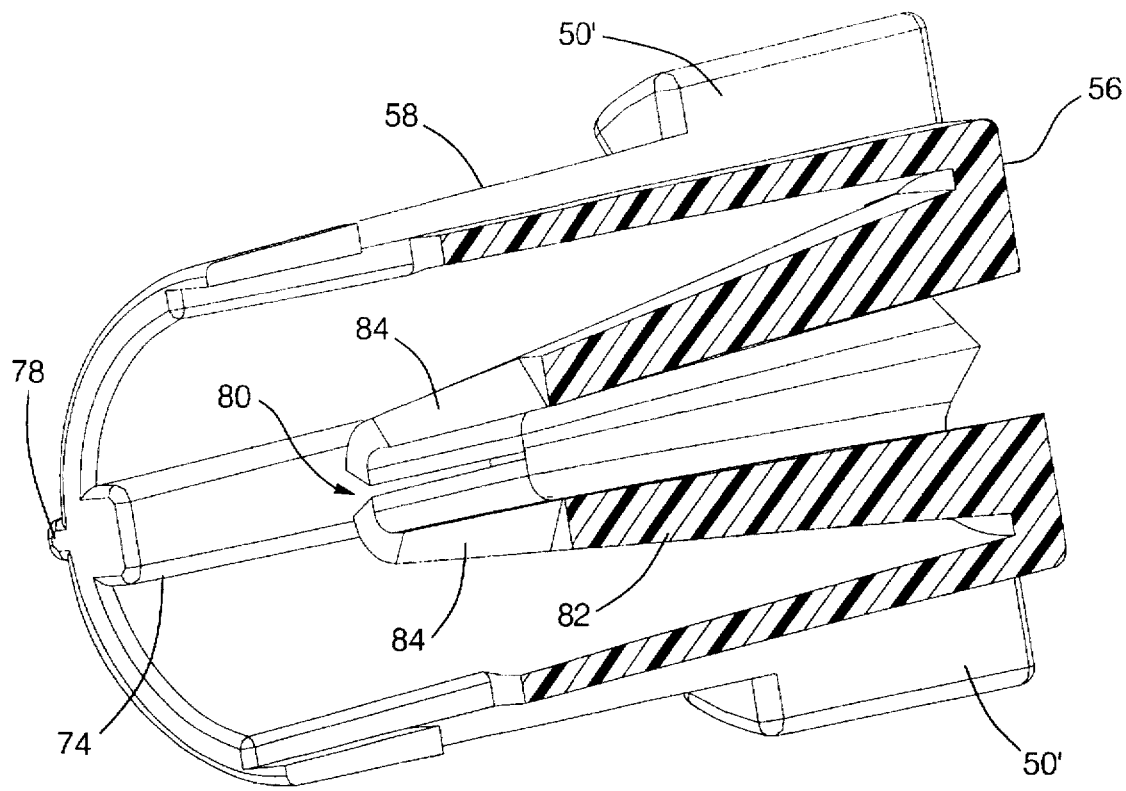
FIG. 8 is an enlarged sectional view of a four-way female connector according to the present invention.

One-, two-, three- and four-way connectors are now described. As shown in FIG. 4, a one-way connector for one fiber optic cable, has two spaced apart arcuate shaped flexible alignment fingers 84 and positioned so that the fingers define a cable passage 80 that is generally circular in cross section. As shown in FIG. 5, a two-way connector includes two spaced apart flexible alignment fingers 84 and are positioned so that the arcuate shaped fingers define a cable passage 80 that is generally oval-like in cross section to carry two fiber optic cables. As shown in FIG. 6, a three-way connector for carrying three fiber optic cables, includes three radially spaced apart arcuate shaped flexible alignment fingers 84. The arcuate shaped flexible fingers 84 define a cable passage 80 that is generally triangular in cross section. As shown in FIG. 7, a four-way connector includes four radially spaced apart arcuate shaped flexible alignment fingers 84 for engaging the sides of fiber optic cables. The four arcuate shaped flexible fingers 84 define a cable passage 80 that is generally rectangular or square in cross section to carry four fiber optic cables. As will be appreciated from FIGS. 4-7, any number of fiber optic cables 16 may be carried in a connector utilizing flexible alignment fingers 84 according to the present invention. Further, a four-way connector may be connected to a three-, two- or one-way connector and vice versa to split light passing through the cables in a fashion which is appropriate for the application desired. Further, the components of the present invention can also be used in a data transmission application.

We claim:

1. A fiber optic inline connector system comprising:
   a male connector comprising a connector housing having a cable passage extending therethrough, a plurality of flexible cable alignment fingers extending from the housing for engaging and aligning a fiber optic cable and constructed and arranged with sufficient flexibility to allow a fiber optic cable to be inserted into the male housing and sufficient resiliency to accurately align the cable with respect to a center line extending through the cable passage;

a female connector having a connector housing including a cable passage extending therethrough and a plurality of flexible cable alignment fingers extending from the housing for engaging and aligning a fiber optic cable and constructed and arranged with sufficient flexibility to allow a fiber optic cable to be inserted into the female connector and sufficient resiliency to accurately align the cable with a center line extending through the cable passage;

said male and female connectors being constructed and arranged to be mated together to reduce loss of light associated with misalignment of fiber optic cables in the male and female connectors.

2. A fiber optic inline connector system as set forth in claim 1 wherein the female connector housing includes a shell having a base connected at one end and the other end being open, the shell having a lock shoulder formed on an inside wall of the shell near the open end, and wherein the male connector housing comprises a shell having a base connected at one end and a plurality of spaced apart tongues extending from the other end, a lock nub positioned on an outer surface of one of the tongues, the tongues being constructed and arranged with sufficient flexibility to be inserted into the open end of the shell of the female connector and so that the locking nub on the tongue snap locks against the shoulder formed on the inside wall of the female connector shell.

3. A fiber optic inline connector system as set forth in claim 1 further comprising a terminal position assurance member for connecting to one of the male and female connectors, wherein the terminal position assurance member comprises a base having an aperture formed therethrough, an engagement surface adjacent the aperture, and a flexible locking finger extending from the base, the flexible locking finger having a locking shoulder; and further comprising a fiber optic cable having a jacketed portion terminating in a crimped ring, the crimped ring having an annular lip formed on an outer surface thereof, and wherein the fiber optic cable is extended through the aperture in the base of the terminal position assurance member and the locking shoulder of the flexible locking finger and the engagement surface engage the annular lip on the crimped ring to lock the fiber optic cable in position.

4. A fiber optic cable system as set forth in claim 1 wherein at least one of the male and female connector shells includes a pair of spaced apart troughs formed in an outer surface thereof, and wherein said system further comprises a terminal position assurance member comprising a base having apertures formed therethrough each for receiving a fiber optic cable and a saddle extending from the base and a locking rail extending inwardly from edges of the saddle, the saddle being constructed and arranged to be placed over a portion of the shell of an associated connector and each locking rail snapped into one of the troughs formed in the shell.

5. A fiber optic connector as set forth in claim 1 wherein each of the male and female connector housings comprises a shell and a base connected at one end of the shell, a projection extending from the base into a cavity defined by the shell, a cable passage defined through the base and through the projection, and wherein the plurality of flexible cable alignment fingers extend from the projection.

6. A fiber optic inline connector as set forth in claim 1 wherein the cable has cylindrical walls and the plurality of flexible cable alignment fingers have an arcuate-like shape to engage the cylindrical outer walls of the fiber optic cable.

7. A fiber optic inline connector system as set forth in claim 1 wherein two flexible cable alignment fingers extend from at least one of the male and female housings and are constructed and arranged to align a single fiber optic cable.

8. A fiber optic inline connector system as set forth in claim 7 wherein the flexible cable alignment fingers are arcuate shaped and are constructed and arranged to define a generally circular cable passage for receiving the single fiber optic cable.

9. A fiber optic inline connector as set forth in claim 1 wherein two flexible cable alignment fingers extend from at least one of the male and female housings and have an arcuate shape constructed and arranged to define a generally oval-shaped cable passage for aligning two fiber optic cables.

10. A fiber optic inline connector system as set forth in claim 1 wherein three flexible cable alignment fingers extend from at least one of the male and female housings to align three fiber optic cables.

11. A fiber optic inline connector as set forth in claim 10 wherein the flexible cable alignment fingers are arcuate shaped and are constructed and arranged to define a generally triangular-shaped cable passage for receiving the three fiber optic cables.

12. A fiber optic inline connector as set forth in claim 1 wherein four flexible cable alignment fingers extend from at least one of the male and female housings to align four fiber optic cables.

13. A fiber optic inline connector as set forth in claim 12 wherein the flexible cable alignment fingers have an arcuate shape and are constructed and arranged to define a generally rectangular-shaped cable passage for receiving the four fiber optic cables.

14. A fiber optic inline connector system as set forth in claim 1 wherein two flexible cable alignment fingers extend from at least one of the male and female housings and are constructed and arranged to align two fiber optic cables.

* * * * *